United States Patent
Dooley

(10) Patent No.: US 7,296,651 B2
(45) Date of Patent: Nov. 20, 2007

(54) POWER STEERING SYSTEM FREQUENCY SUPPRESSOR

(75) Inventor: John Dooley, Chesterfield, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 11/788,704

(22) Filed: Apr. 20, 2007

(65) Prior Publication Data

US 2007/0193641 A1     Aug. 23, 2007

Related U.S. Application Data

(62) Division of application No. 11/410,596, filed on Apr. 25, 2006.

(60) Provisional application No. 60/753,086, filed on Dec. 22, 2005.

(51) Int. Cl.
*B62D 5/06* (2006.01)

(52) U.S. Cl. .................. 180/441; 180/417; 280/90

(58) Field of Classification Search ............. 180/441, 180/417, 434; 280/90; 137/519.5; 91/443
See application file for complete search history.

(56) References Cited

U.S. PATENT DOCUMENTS

| | | | |
|---|---|---|---|
| 571,243 A | 11/1896 | Reedk | |
| 942,666 A | 12/1909 | Romstaedt | |
| 1,767,100 A | 6/1930 | Tannehill | |
| 1,774,095 A | 8/1930 | Hajek | |
| 2,030,943 A | 2/1936 | Schrottke | |
| 2,100,404 A | 11/1937 | Mason | |
| 2,233,804 A | 3/1941 | Bourne | |
| 2,273,766 A | 2/1942 | Tower | |
| 2,401,570 A | 6/1946 | Koehler | |
| 2,460,121 A | 1/1949 | Brielmaier | |
| 2,474,512 A | 6/1949 | Stephens | |
| 2,565,374 A | 8/1951 | Kitchel | |
| 2,630,833 A | 3/1953 | Ragsdale | |
| 2,631,614 A | 3/1953 | Stephens | |
| 3,660,979 A | 5/1972 | Kamakura | |
| 4,285,534 A * | 8/1981 | Katayama et al. | 285/119 |
| 4,324,276 A | 4/1982 | Kemner | |
| 4,562,036 A | 12/1985 | Shin | |
| 4,595,037 A | 6/1986 | LeBreton | |
| 5,983,946 A | 11/1999 | Chen | |
| 6,450,286 B1 * | 9/2002 | Rui et al. | 180/441 |
| 6,568,500 B1 * | 5/2003 | Krieger et al. | 180/442 |
| 6,820,714 B2 * | 11/2004 | Schymczyk et al. | 180/442 |
| 7,086,413 B2 * | 8/2006 | Yu et al. | 137/493.9 |
| 2001/0013442 A1 * | 8/2001 | Sonoda | 180/441 |
| 2002/0157711 A1 * | 10/2002 | Engler | 137/519.5 |
| 2006/0201734 A1 * | 9/2006 | Hartle | 180/417 |

* cited by examiner

*Primary Examiner*—Tony Winner
(74) *Attorney, Agent, or Firm*—Rader, Fishman & Grauer PLLC

(57) ABSTRACT

A frequency suppressor for a hydraulic system is shown and described. The frequency suppressor comprises a housing that contains a substantially fixed mass of a compressible substance. The volume of the compressible substance is varied to dampen frequency disturbances in the hydraulic system.

7 Claims, 3 Drawing Sheets

POWER STEERING SYSTEM FREQUENCY SUPPRESSOR

CROSS REFERENCE TO RELATED APPLICATIONS

The present application is a divisional of U.S. patent application Ser. No. 11/410,596, filed Apr. 25, 2006, the entirety of which is hereby incorporated by reference, and claims the benefit of U.S. Provisional Application No. 60/753,086, filed on Dec. 22, 2005, the entirety of which is hereby incorporated by reference.

FIELD

Fluid driven actuation devices are disclosed, wherein fluid pumped at elevated pressure effects actuation, and in particular to the suppression and/or damping of fluid pressure disturbances, which may manifest themselves as audible noise or tangible vibrations.

BACKGROUND

In hydraulic systems, even with a fully filled fluid circuit, normal operation may create pressure disturbances within the fluid of sub second duration and/or frequency. Fluid disturbance effects may be considered as falling into two general categories. For example, in power steering hydraulic systems, a first fluid disturbance effect may be considered as relating to vehicle reliability insofar as disturbances may build to a resonance and/or impose stresses on components that could lead to premature component failure and/or loss of vehicle control. A second fluid disturbance effect may be considered as relating to nuisance insofar as the disturbance gives rise to noises and/or vibrations noticeable to the vehicle occupants. "Reliability" disturbances indiscernible by the occupants may thus not constitute a nuisance as such, just as "nuisance" disturbances may not affect the reliability of the vehicle. Notwithstanding the apparent inconsequential nature of "nuisance" disturbances, they are of significant importance to vehicle manufacturers insofar as they have profound effects on customer satisfaction with the product.

It will be appreciated that whether or not a physical disturbance effect is considered as noise or a vibration depends upon its frequency relationship to the physiologically defined senses of any occupant or user; in physical terms both are vibrations and are hereinafter considered as such except when specifically distinguished. Such variety of disturbances which affect, that is, are noticeable to, the occupants of motor vehicles are also often called by the collective term "noise, vibration, harshness" or its abbreviation "NVH".

Moreover, these issues are not limited to a fluid actuation device in the form of a vehicle steering mechanism for which the fluid is a hydraulic liquid. Analogous fluid driven actuation devices for non vehicular use and/or devices using gaseous driving fluid may suffer some or all of the outlined effects and benefit from an alternative approach to damping.

SUMMARY OF THE EMBODIMENTS

A frequency suppressor comprises a housing having an interior and a plurality of internal chambers within the interior. The frequency suppressor also comprises a substantially fixed mass of a compressible substance contained in the housing, wherein the substantially fixed mass of the compressible substance occupies a volume that varies in response to pressure fluctuations in the hydraulic system. In certain exemplary embodiments, the housing has a length and the plurality of internal chambers is spaced apart along its length. In other exemplary embodiments, the housing has at least one separator disposed along its length within the interior, such that the housing and the separator define the plurality of internal chambers. In still other exemplary embodiments, the separator comprises an orifice. In further exemplary embodiments, the plurality of internal chambers comprises a first internal chamber in fluid communication with a second internal chamber, the housing has a separator disposed along its length within the interior, such that the housing and the separator define the first and second internal chambers, a first portion of the substantially fixed mass of the compressible substance is contained in the first internal chamber, a second portion of the substantially fixed mass of the compressible substance is contained in the second internal chamber, and when the hydraulic system pressure fluctuates, there is a pressure drop across the separator.

A hydraulic system for delivering a liquid comprises a pump having a discharge connected to a discharge conduit, and a substantially fixed mass of a compressible substance in fluid communication with liquid contained in the discharge conduit. The substantially fixed mass of the compressible substance occupies a volume that varies in response to pressure fluctuations in the hydraulic system.

A method of suppressing frequency disturbances in a hydraulic system is provided. The method comprises providing a substantially fixed mass of a compressible substance and varying the volume of the compressible substance to dampen the frequency disturbances.

BRIEF DESCRIPTION OF THE DRAWINGS

Embodiments of the invention will now be described by way of example in greater detail with reference to the attached figures, in which.

DETAILED DESCRIPTION

Figure 1:
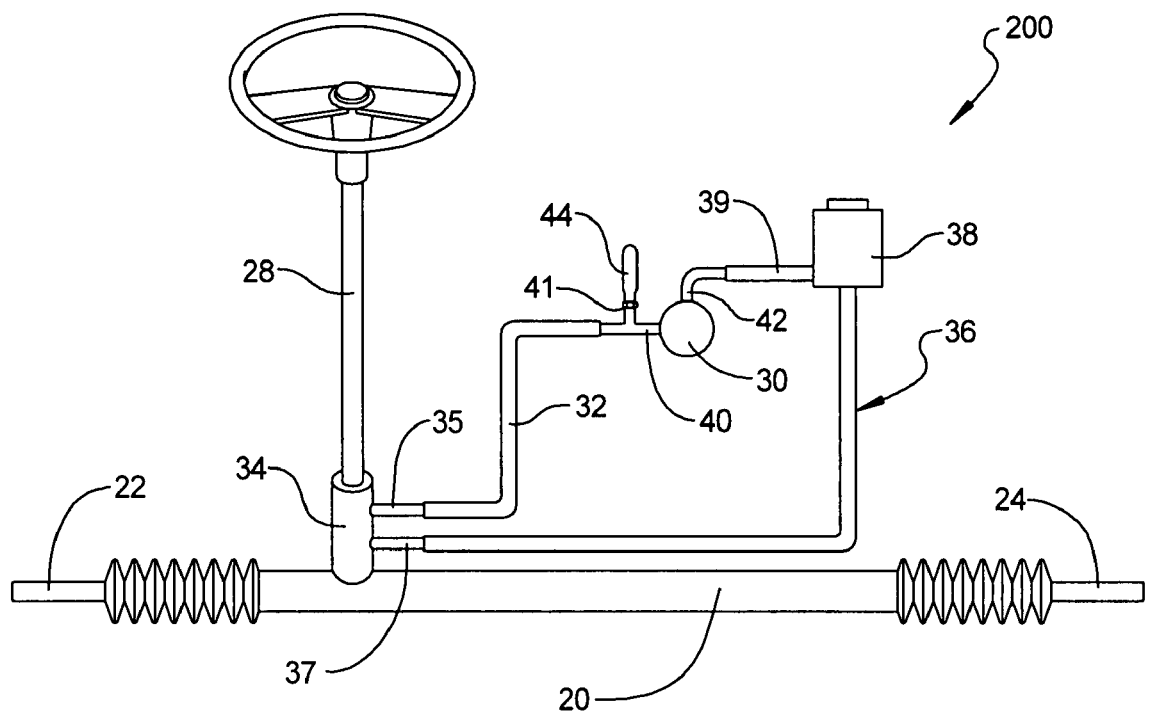
FIG. 1 shows the general arrangement of a vehicle fluid power assisted steering system incorporating a frequency suppressor.

FIG. 1 shows generally at 200 a fluid driven actuation device comprising a power assisted steering system of a road vehicle (not shown) in which it is mounted. Although the specific system of FIG. 1 is a power steering system, embodiments may be used with other types of hydraulic systems, and their use is not limited to power steering applications nor to systems having hydraulic liquid. For example, gaseous driving fluid may also benefit. As will be explained in greater detail below, power steering system 200 includes frequency suppressor 44 which utilizes a fixed mass of a compressible substance to dampen and/or suppress frequency disturbances.

In the power assisted steering system of FIG. 1, fluid in the form of hydraulic oil under pressure is used to reduce the steering effort for the vehicle driver. The power assisted steering system comprises an actuator in the form of a rack 20 mounted on the body or chassis thereof coupled to the road wheels by track rods 22 and 24 and within casing 26 gearing (not shown) at a pressure determined by the turn angle of the steering wheel coupling the track rods to a steering wheel 28. These components comprise a mechanical circuit of the device.

The steering system also comprises a pump 30 driven by the vehicle prime mover (e.g., an internal combustion engine or separate electric motor); the manner of driving power assisted pumps for various systems within vehicles is well known and not described further. Output from the pump discharge is taken by way of a supply line 32 to a steering gear valve 34 of the device mounted by the rack casing. Steering gear valve 34 applies high pressure liquid to a rack piston (not shown) to supplement force applied by the driver to the steering wheel. Return line 36 connects a rigid conduit 37 on steering gear valve 34 to reservoir 38. Suction line 39 connects reservoir 38 and pump 30. The components 30 to 39 comprise a hydraulic circuit of the device.

Insofar as the reservoir is typically at atmospheric pressure, then depending upon the flow of liquid around the system, the pump creates a pressure rise of from slightly below to significantly above atmospheric pressure and the fluid, in passing through the steering gear valve and rack actuator, suffers a pressure drop such that although the fluid leaving the rack is above atmospheric pressure, it is low in relation to the pump delivery pressure and further diminishes as a pressure gradient along the return line to the reservoir.

As indicated in FIG. 1, pump 30 is connected to a generally rigid discharge conduit 40, which is connected to one end of hose 32. Discharge conduit 40 comprises a branched structure such as a "y" or "t," and in the embodiment of FIG. 1 includes a branch 41 for attaching additional hydraulic system components. Hose 32 is generally flexible along its length and is connected at one end to a rigid conduit 35 at steering gear valve 34.

The pump may create fluid disturbances in the form of high pressure peaks and other effects due to cavitation within the pump, which disturbances may emanate from the high pressure part of the hydraulic circuit and/or have influence on the actuator and return line parts. Furthermore, the steering gear valve 34 may be the source of mechanical noises and pressure disturbances within the fluid. Within the steering arrangement of a road vehicle, the turning force needed from the steering wheel increases as a function of the increase in angle of the road wheels from the straight ahead position; in supplying fluid power assistance from the hydraulic circuit this is effected by designing the steering gear valve with a so called boost curve that provides little power assistance for large increments to small absolute turning angles, but large gains in assistance for small incremental changes at large absolute angles. Such a large gain, and thus sensitivity to small changes, applies both to commanded inputs from the steering wheel and involuntary disturbances resulting from external shocks transmitted into the system from the road wheels. Insofar as the valve typically has internal components displaced in accordance with pressure differentials to define fluid flow orifices, it is possible at high gain for such internal components to succumb to oscillation or flutter, amplifying variations in fluid pressure and creating mechanical noise. It is also possible for such valve to create noise and flow disturbances due to passage of fluid through small orifices therein, and for such noise and flow disturbances to pass from the steering gear valve through the low pressure return line. Such noises derived from the steering gear valve are sometimes referred to as "rack rattle" and "grunt". Such disturbance tends to be at lower frequencies than pump cavitation noises in the high pressure line.

In accordance with a first embodiment of the invention, there is provided a frequency suppressor within the steering system, being indicated generally at 44. As used herein, the term "suppressor" should be understood to encompass frequency dampening devices which reduce the effects (e.g., noise) caused by frequency disturbances, and the term is not limited solely to devices that completely eliminate their effects.

The frequency suppressor is coupled to discharge conduit 40 of pump 30, preferably as close to the pump discharge as possible. In the embodiment of FIG. 1, suppressor 40 is attached to branch 41 on discharge conduit 40. Although frequency suppressor 40 could be located on return line 36, or farther downstream from discharge conduit 40, it is believed that locating it as close as possible to the pump discharge beneficially dampens pump frequency disturbances before they affect the steering gear.

The hydraulic circuit of power steering system 200 is a closed system. Any compressible substance, such as air or other compressible gas, contained in suppressor 44 will generally remain therein, save for relatively minor amounts which may dissolve in the hydraulic oil. As a result, frequency suppressor 44 provides a substantially fixed mass of a compressible substance which is in fluid communication with the hydraulic oil discharged from pump 30.

The compressible substance occupies a volume within suppressor housing 45 (shown in FIG. 2) which varies in response to pressure changes in the hydraulic oil, thereby dampening and/or suppressing them. For example, as the hydraulic oil discharge pressure increases, the level of oil in suppressor 44 will rise to compress the compressible substance, thereby expanding the liquid volume of system 200 and at least partially offsetting the pressure increase. Conversely, as the hydraulic oil discharge pressure decreases, the level of oil in suppressor 44 will decrease, allowing the compressible substance to expand, thereby at least partially offsetting the pressure decrease. Thus, frequency suppressor 44 effectively provides a variable surge volume for system frequency disturbances.

In power steering systems such as system 200, hydraulic oil is used to actuate a rack piston. In contrast, the compressible substance referred to herein is not used as an actuating fluid, but rather, provides a variable surge volume for the hydraulic oil. As indicated above, hydraulic fluids used in accordance with the foregoing embodiments are generally incompressible, and the compressible substance used in suppressor 44 is generally significantly compressible. However, known fluids vary as to their specific viscosities, and the particular substances selected for the compressible substance and hydraulic oil may affect the frequency suppression response of suppressor 44. As the compressible substance becomes relatively more compressible than the hydraulic oil, suppressor 44 will tend to suppress frequency disturbances more quickly and/or more completely because changes in the liquid volume within housing interior 45 of suppressor 44 will more quickly change the volume of the compressible substance in housing interior 45. As the relative compressibility of the compressible substance and hydraulic oil decreases, the opposite effect will occur.

Figure 2:
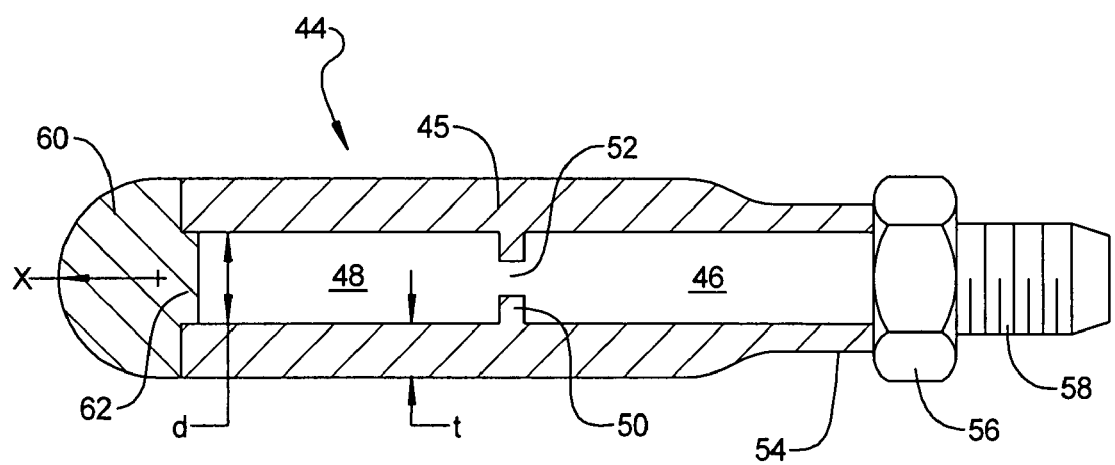
FIG. 2 is a cross-sectional view of the frequency suppressor of FIG. 1.

Referring to FIG. 2, a preferred embodiment of frequency suppressor 44 is depicted. Frequency suppressor 44 may have a variety of different shapes. However, for ease of manufacturing and to evenly distribute stresses throughout housing 45, it is preferably symmetrical. In the embodiment of FIG. 2, frequency suppressor 44 comprises a generally cylindrical housing 45 with a partially-spherical, solid closed end 60. Nevertheless, other shapes such as spherical shape or a symmetrical polygonal shape could also be used.

A compressible substance, preferably a compressible gas such as air, is contained within the interior of housing 45. The interior preferably comprises a plurality of internal chambers. In the embodiment of FIG. 2, two internal chambers 46 and 48 are provided. As described further below, the use of a plurality of internal chambers minimizes the amount of hydraulic fluid entering chamber 48. This helps prevent the hydraulic oil from becoming entrained in or mixing with the compressible substance, which could diminish compressibility, and consequently, the damping ability of suppressor 44. To further prevent the mixing of hydraulic oil and the compressible substance, frequency suppressor 44 is preferably installed in an upright position with respect to the ground (see FIG. 1). Because the hydraulic oil has a relatively greater density than the compressible substance, an upright orientation further reduces the likelihood that the hydraulic oil will mix with or become entrained in the compressible substance.

Separator 50 is provided to separate the interior of housing 45 into chambers 46 and 48. Separator 50 may comprise a number of different shapes and geometries, but is preferably designed to prevent mixing of the compressible substance from the hydraulic oil. In the embodiment of FIG. 2, separator 50 is an orifice with a single through-hole 52. However, it may also include a plurality of openings.

It is believed that the opening area of separator 50 affects the sensitivity of suppressor 44 to pressure fluctuations. Referring to FIG. 2, if the compressible substance/hydraulic oil interface is located in chamber 46, as the hydraulic oil pressure increases, the interface will move to the left (towards chamber 48), forcing a portion of the compressible substance into chamber 48, and increasing the mass of the compressible substance contained in the chamber's fixed volume. It is believed that some of the force applied to the compressible substance by the hydraulic oil will dissipate across separator 52 causing a temporary pressure drop across separator 52 due to its restricted opening area. Because of this dissipation, the pressure in chamber 48 will not respond immediately to changes in the pressure in chamber 46, but instead, will experience a slight delay and/or lagged response. Conversely, as the hydraulic oil pressure decreases, the compressible substance/hydraulic oil interface will move to the right, allowing some portion of the compressible substance to enter chamber 46, decreasing the mass of the compressible substance contained in the fixed volume of chamber 48 while increasing the mass of the compressible substance contained in the fixed volume of chamber 46. However, the opening area of separator 50 will cause a delay and/or lag in the expansion of compressible substance into chamber 48. Thus, it is believed that the restricted opening area of separator 50 will effectively filter the response of the compressible substance pressure in chamber 48 to changes in hydraulic oil pressure in chamber 46.

As suggested by the foregoing, it is believed that by adjusting the relative opening area (e.g., the area of orifice hole 52) of separator 50, suppressor 44 can be "tuned" to obtain the desired response of suppressor 44 to hydraulic system pressure changes. However, as the opening area increases, the likelihood of entraining hydraulic oil in the compressible substance also increases. Thus, the opening area (e.g., the area of the orifice hole 52) of separator 50 is preferably sized to be about eight (8) to about twelve (12) percent of the interior cross-sectional area (i.e., the area perpendicular to the length of housing 45). However, opening areas of from about nine (9) to about eleven (11) percent of the cross-sectional area are more preferred and an opening area of about ten (10) percent of the cross-sectional area is especially preferred. In one exemplary embodiment of suppressor 44, chambers 46 and 48 are cylindrical and have a diameter of about eight (8) mm, while separator 50 comprises a 2.5 mm thick orifice with a hole 52 diameter of about 2.5 mm.

The ratio of the volumes of chambers 46 and 48 may also affect the damping performance of suppressor 44. For ease of manufacturing, the volumes are substantially equal. However, ratios of 30 percent to about 70 percent (volume of chamber 46/volume of chamber 48) may also be used. In one exemplary embodiment, chambers 46 and 48 each have a diameter of about 8 mm and a length of about 38 mm.

Suppressor 44 also preferably provides mass damping to dissipate fluid disturbances in hydraulic system 200. To obtain mass damping without the use of an unduly large suppressor 44, relatively dense materials such as steel or aluminum are preferred. In exemplary embodiments, the ratio of the mass of suppressor 44 to its internal volume (i.e., fluid volume) is generally from about 8 to about 16 g/cm$^3$. Ratios of from about 10 to about 12 g/cm$^3$ are preferred and a ratio of 11.5 g/cm$^3$ is especially preferred. In one exemplary embodiment, suppressor 44 has a mass of 44 g and an internal fluid volume of about 3.8 cm$^3$.

Referring again to FIG. 2, suppressor 44 is generally shaped to facilitate attachment to hydraulic system 200. Tapered neck 54 and hexagonal fitting 56 are provided to facilitate attachment with a wrench or pliers. Male threaded connector 58 is provided to allow for engagement with a threaded female connector in branch 41 of conduit 40. Conversely, connector 58 may be designed as a female connector that engages a male connector on hydraulic system 200. Other known connectors may also be used. Unlike many known devices used for frequency suppression, suppressor 44 may be readily installed on an existing power steering system without performing extensive modifications to it.

Typical hydraulic systems operate at pressures up to about 2000 psi. Thus, suppressor 44 should be designed to reliably withstand these pressures. In the embodiment of FIG. 2, housing 45 generally has a wall thickness t of from about 40 percent to about 60 percent of the inner diameter d of housing 45. Thicknesses of from about 45 to about 55 percent of the inner diameter are preferred and a thickness of about 50 percent is especially preferred. In one exemplary embodiment, suppressor 44 has an inner diameter of about 8 mm and a wall thickness of about 4 mm.

Closed end 60 of suppressor 44 is preferably a solid semi-spherical shape. Closed end 60 has a minor axis x that is generally from about 35 to about 45 percent of the outer diameter of suppressor 44. More preferably, minor axis x is about 38 percent of the outer diameter. In one exemplary embodiment, suppressor 44 has an outer diameter of about 16 mm and closed end 60 has a minor axis of about 6 mm. Closed end 60 also preferably has a solid flange 62 that abuts the interior walls of housing 45 within chamber 48. Closed end 60 is preferably a turned part that is lathed to the desired shape and dimensions. A brazed washer is then placed between closed end 60 and housing 45. The brazed washer is then heated such that it melts into place to affix closed end 60 to housing 45.

The steering system 200 of FIG. 1 is exemplary as regards its mechanical and hydraulic circuit. Mechanically the described rack may be replaced by a steering box. Furthermore, the hydraulic circuit is one in which a partially filled reservoir defines an atmospheric pressure datum and permits thermal expansion and contraction of the liquid that may typically occur with a diurnal cycle. It will be appreciated that the above described frequency suppressor may be employed in a so called reservoirless system, wherein the hydraulic circuit is sealed from the atmosphere and includes in the lowest pressure part of the circuit a flexibly walled container that varies its volume to accommodate expansion and contraction of the enclosed liquid volume without changing the pressure across its wall.

A method of installing the frequency suppressor 44 will now be described. In accordance with the method, at the time the power steering system is assembled, frequency suppressor 44 is attached to branch 41 of pump discharge conduit 40 via connector 58. The system is preferably exposed to the atmosphere before it is charged with hydraulic oil to allow a fixed mass of air to enter the interior of suppressor housing 45. The mass will generally equal the inner volume of housing 45 times the density of the compressible substance at the prevailing pressure and temperature. The system is then charged with hydraulic oil, thereby trapping a fixed mass of air in chamber 48. In addition, suppressor 44 could also be designed with a valve that allows it to be charged with a compressible substance after installation.

Figure 3:
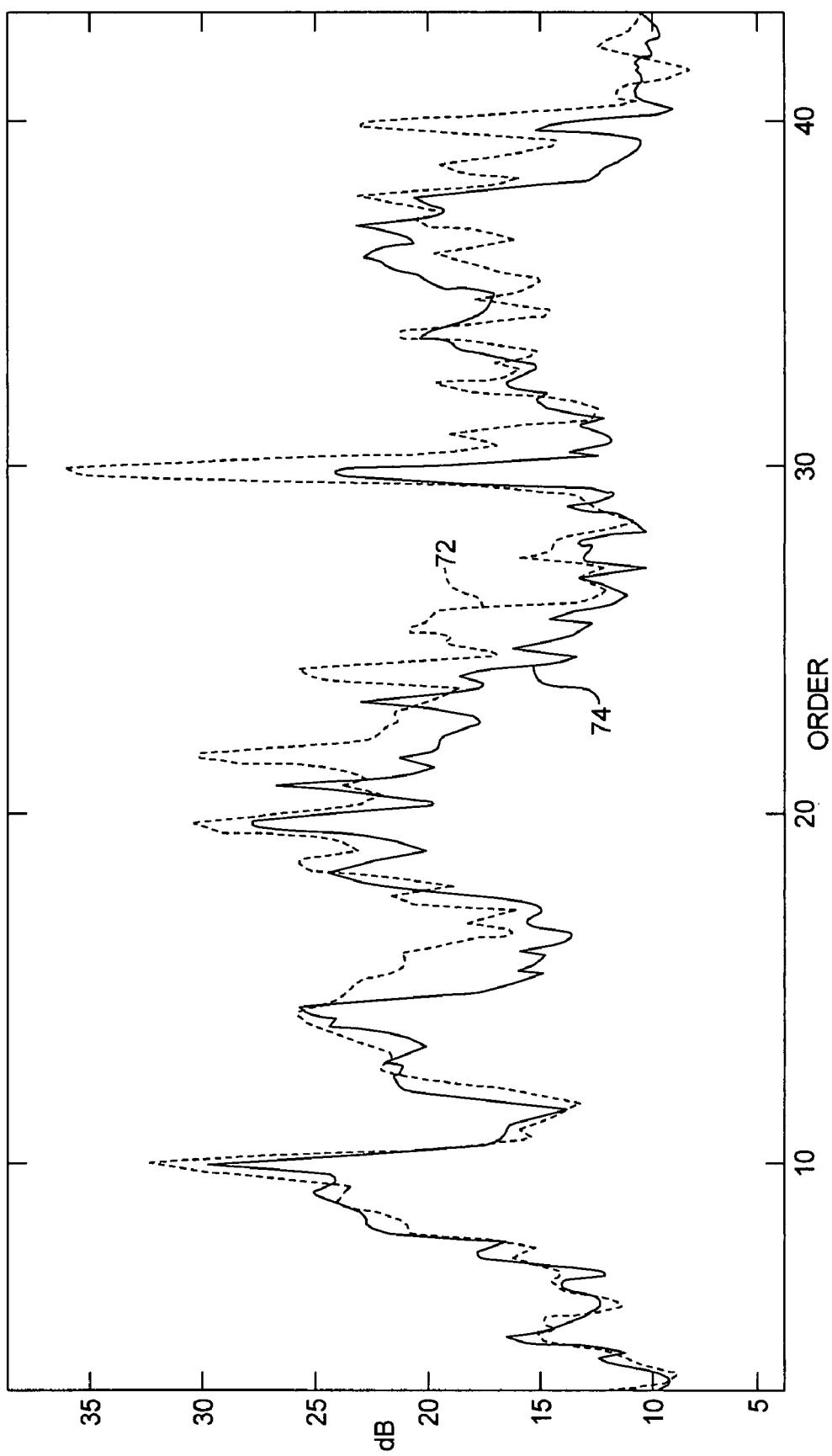
FIG. 3 is a graph depicting the noise suppression characteristics of an embodiment of a frequency suppressor, as illustrated with a test vehicle power steering system.

To demonstrate its frequency suppression ability, the suppressor 44 of FIG. 2 was tested by placing it on a power steering system in a Ford Fusion test vehicle. Noise data was collected in the cabin of the vehicle as it idled while the steering wheel was rotated from the fully-left rotated position to the fully-right rotated position at a generally constant rate of rotation. The resulting noise data is presented in FIG. 3. Referring to FIG. 3, line 72 represents the decibel level at a reference location in the test vehicle's cabin with no suppressor connected to the vehicle's power steering system. Line 74 represents the decibel level at the same cabin location with suppressor 44 attached to the vehicle's power steering system in the manner depicted in FIG. 1.

The x-axis in FIG. 3 represents the order of the measured noise frequency, which is a relative measurement of the cabin noise frequency as compared to the power steering pump's frequency. The power steering pump used in the test vehicle was a vane pump having ten (10) vanes. The vehicle idle speed was 800 RPM. Thus, the disturbance frequency attributable to the operation of the power steering fluid pump was approximately 13.3 rev/second×10 vanes=133 Hz. Both the decibel level and the frequency of the noise in the test vehicle cabin were recorded. The order numbers on the x-axis of FIG. 3 represent multiples of ten (10) of the frequency of the measured noise divided by the 133 Hz pump frequency (i.e. the 10th order corresponds to a 133 Hz noise frequency, the 20th order corresponds to a 266 Hz noise frequency, etc.). As the data in FIG. 3 indicates, the use of suppressor 44 provided substantial noise reductions in the test vehicle cabin at the 10th, 20th, 30th, and 40th orders. The noise reduction provided by suppressor 44 was especially pronounced at the 30th and 40th orders. For example, at the 30th order, the unsuppressed noise level was approximately 36 dB while the suppressed level was approximately 24 dB.

Figure 4:
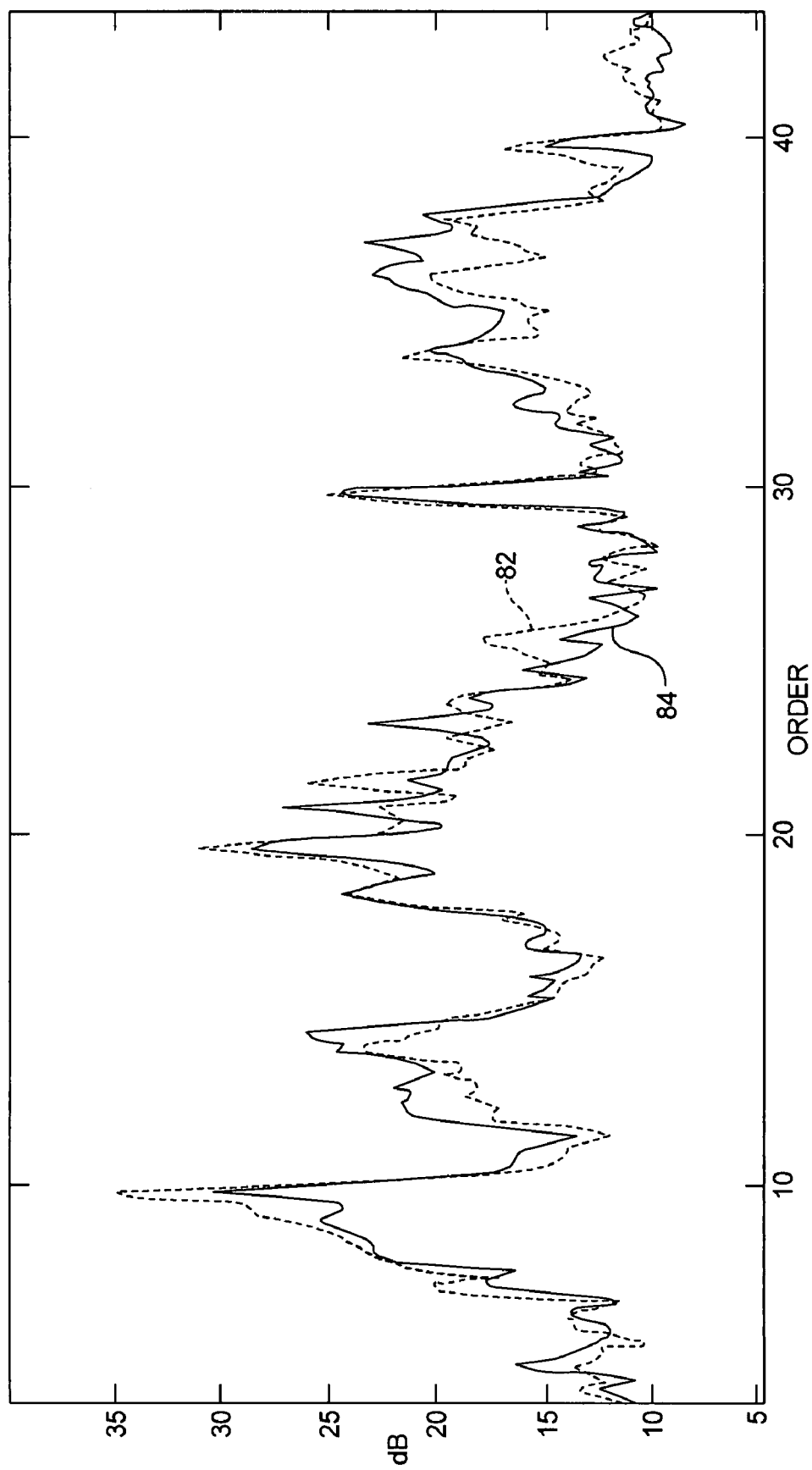
FIG. 4 is a graph depicting the relative noise suppression characteristics of an embodiment of a frequency suppressor and a known device.

Next, suppressor 44 was compared to a commercially available noise suppression device supplied by Dayco Products of Tulsa, Okla. Noise data was recorded in the vehicle cabin for both devices using the same procedure described above with respect to FIG. 3. The resulting noise data is presented in FIG. 4. The y-axis represents the decibel level in the test vehicle cabin for both the Dayco device (line 82) and suppressor 44 (line 84), while the x-axis represents the order of the measured noise (i.e., the measured noise frequency divided by 133 Hz and multiplied by 10) for each respective device. As the figure indicates, suppressor 44 provided unexpectedly better noise suppression than the Dayco device, especially at the 10th and 20th orders. For example, at a 10th order noise frequency, suppressor 44 yielded a decibel level of approximately 29 dB while the Dayco device yielded a decibel level of 35 dB.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A power steering system, comprising:
    a power steering wheel assembly;
    a steering fluid pump for delivering steering fluid to the power steering wheel assembly; and
    a substantially fixed mass of a compressible substance in fluid communication with steering fluid discharged from the pump, wherein the substantially fixed mass of the compressible substance occupies a volume that varies in response to pressure fluctuations in the hydraulic system.

2. The power steering system of claim 1, further comprising a frequency suppressor, wherein the pump is connected to a discharge conduit, and the frequency suppressor is connected to the discharge conduit, the frequency suppressor comprising (a) a housing having a length and an interior containing the substantially fixed mass of a compressible substance, (b) a plurality of internal chambers within the housing interior, and (c) at least one separator disposed along the length of the housing within the interior of the housing, such that the housing and the at least one separator define the plurality of internal chambers;
    wherein one of the plurality of internal chambers contains a substantially fixed volume of the compressible substance, and the substantially fixed volume of the compressible substance has a mass that changes in response to pressure fluctuations in the power steering system.

3. The power steering system of claim 2, wherein the steering fluid and the compressible substance define an interface within the frequency suppressor.

4. The power steering system of claim 1, further comprising a frequency suppressor, the frequency suppressor comprising:

a housing having a length, an interior, and first and second internal chambers within the interior, the first internal chamber being in fluid communication with the second internal chamber;

a separator disposed along the length of the housing within the interior of the housing such that the housing and the separator define the first and second internal chambers;

wherein a first portion of the substantially fixed mass of the compressible substance is contained within the first internal chamber, a second portion of the substantially fixed mass of the compressible substance is contained within the second internal chamber, and when the power steering system pressure fluctuates, there is a pressure drop across the separator.

5. The power steering system of claim 4, wherein the first internal chamber has a pressure, the second internal chamber has a pressure, and the separator filters the response of the first internal chamber pressure to changes in the second internal chamber pressure.

6. The power steering system of claim 1, further comprising a frequency suppressor, the frequency suppressor comprising a housing having a length, an interior, and at least one separator disposed along its length within the interior, wherein the substantially fixed mass of the compressible substance is contained within the housing interior, the housing and the at least one separator define a plurality of internal chambers, and a portion of the compressible substance is displaced from one of the internal chambers into another of the internal chambers in response to pressure fluctuations in the hydraulic system.

7. The power steering system of claim 6, wherein the housing interior has a cross-sectional area, the at least one separator includes at least one opening having a cross-sectional area, and the opening cross-sectional area is less than the housing interior cross-sectional area.

* * * * *